US012676855B2

(12) United States Patent
Guionneau

(10) Patent No.: US 12,676,855 B2
(45) Date of Patent: Jul. 7, 2026

---

(54) METHOD AND SYSTEM FOR AUTHENTICATING A USER ON AN IDENTITY-AS-A-SERVICE SERVER

(71) Applicant: BULL SAS, Les Clayes-sous-Bois (FR)

(72) Inventor: Christophe Guionneau, Grenoble (FR)

(73) Assignee: BULL SAS, Les Clayes-sous-Bois (FR)

( * ) Notice: Subject to any disclaimer, the term of this patent is extended or adjusted under 35 U.S.C. 154(b) by 461 days.

(21) Appl. No.: 17/992,857

(22) Filed: Nov. 22, 2022

(65) Prior Publication Data

US 2023/0171250 A1 Jun. 1, 2023

(30) Foreign Application Priority Data

Nov. 29, 2021 (EP) ..................................... 21306651

(51) Int. Cl.
    *H04L 9/40* (2022.01)
(52) U.S. Cl.
    CPC ...... *H04L 63/0876* (2013.01); *H04L 63/0435* (2013.01); *H04L 63/102* (2013.01)
(58) Field of Classification Search
    CPC ............. H04L 63/0435; H04L 63/0876; H04L 63/102
    USPC ........................................................... 726/4
    See application file for complete search history.

(56) References Cited

U.S. PATENT DOCUMENTS

| | | | | |
|---|---|---|---|---|
| 6,308,275 | B1 * | 10/2001 | Vaswani | ................. G06F 21/53 |
| | | | | 726/2 |
| 9,418,216 | B2 * | 8/2016 | Wetter | ................ H04L 63/0853 |
| 12,413,624 | B2 * | 9/2025 | Ben-Noon | .............. H04L 63/20 |
| 2013/0086669 | A1 * | 4/2013 | Sondhi | ................ H04W 12/068 |
| | | | | 726/8 |
| 2017/0310709 | A1 * | 10/2017 | Foxhoven | ........... H04L 61/4511 |
| 2018/0007059 | A1 | 1/2018 | Innes et al. | |
| 2018/0077144 | A1 * | 3/2018 | Gangawane | .......... H04L 63/102 |
| 2018/0083977 | A1 * | 3/2018 | Murugesan | ........... G06F 3/0482 |
| 2018/0131685 | A1 * | 5/2018 | Sridhar | ................. H04L 9/3226 |
| 2018/0337914 | A1 * | 11/2018 | Mohamad Abdul | ........................ |
| | | | | H04L 9/3213 |

(Continued)

OTHER PUBLICATIONS

NPL Search Terms (Year: 2024).*

(Continued)

*Primary Examiner* — Syed A Zaidi
(74) *Attorney, Agent, or Firm* — Joseph J. Mayo; ARC IP Law, PC

(57) ABSTRACT

The invention includes a method for authenticating a user located in a computer network including an internal authentication of the user with an identification server of the computer network with a user identifier and a user device. The method includes transmission of an authentication request by the user device to an IDAAS server external to the computer network. The method includes an external authentication of the user by the IDAAS server, including transmission of a first message that includes an event identifier associated with the user device by the IDAAS server to a web server of the computer network. The external authentication also includes recovery of the user identifier by the web server, and transmission of a second message that includes the user identifier to authenticate the user by the web server to the IDAAS server. The invention also includes a computer program and an authentication system implementing the method.

12 Claims, 2 Drawing Sheets

(56)  References Cited

U.S. PATENT DOCUMENTS

| 2019/0333054 | A1  | 10/2019 | Cona et al. | |
| 2020/0007541 | A1  | 1/2020 | Appiah et al. | |
| 2021/0306346 | A1* | 9/2021 | Han | H04L 63/083 |
| 2022/0368689 | A1* | 11/2022 | Ben-Noon | H04L 63/20 |
| 2023/0038476 | A1* | 2/2023 | Han | H04L 63/105 |
| 2025/0021688 | A1* | 1/2025 | Arora | H04L 9/321 |
| 2025/0337742 | A1* | 10/2025 | Jeffords | G06F 21/6218 |

OTHER PUBLICATIONS

NPL Search Terms (Year: 2025).*
NPL Search Terms (Year: 2026).*
European Search Report issued in EP21306651, dated May 3, 2022 (2 pages).
Kuperberg, et al., "Blockchain-Based Identity Management: A Survey From the Enterprise and Ecosystem Perspective", IEEE Transactions on Engineering Management, IEEE, vol. 67, No. 4, Nov. 1, 2020.
Marti, et al., "Taxonomy of trust: Categorizing P2P reputation systems", Computer Networks, vol. 50, No. 4, Mar. 15, 2006.

* cited by examiner

METHOD AND SYSTEM FOR AUTHENTICATING A USER ON AN IDENTITY-AS-A-SERVICE SERVER

This application claims priority to European Patent Application Number 21306651.7, filed 29 Nov. 2021, the specification of which is hereby incorporated herein by reference.

BACKGROUND OF THE INVENTION

Field of the Invention

The invention relates to a method for authenticating a user on an identity-as-a-service server. It likewise relates to a system implementing such a method.

The field of the invention is the field of user authentication with a view to accessing applications offered in SaaS mode.

Description of the Related Art

Companies increasingly use "as a service" applications hosted in the cloud, called SaaS applications in the application. These SaaS applications require user authentication. For various reasons, companies have transferred identity and access management to an identity-as-a-service provider, hosted in the cloud, on a server external to the company's computer network, and called an IDAAS ("IDentity As A Service") server.

When a user wishes to access a SaaS application from outside the company's computer network, they are directed to the IDAAS server. The traffic never passes through the company's network.

In the case where the user is located on the company's computer network, they must first be authenticated with an identity server strictly internal to said computer network, using a first authentication mechanism limited to said company's computer network, such as for example Windows® authentication. Then, in order to access an SaaS application, the user must be authenticated with the IDAAS server according to a second authentication mechanism independent of said first authentication mechanism.

This two-factor authentication is cumbersome and time-consuming for users. Furthermore, it complicates the creation and modification of computer access rights for users.

One aim of one or more embodiments of the invention is to solve at least one of the above-mentioned shortcomings.

Another aim of one or more embodiments of the invention is to propose a less cumbersome and time-consuming authentication solution for a user to access, from a computer network, a SaaS application hosted on a server external to said computer network.

At least one embodiment of the invention also aims to propose an authentication solution for a user to access, from a computer network, a SaaS application hosted on a server external to said computer network, allowing more straightforward management of computer access rights.

BRIEF SUMMARY OF THE INVENTION

At least one embodiment of the invention makes it possible to achieve at least one of the aforementioned aims with a method for authenticating a user in a computer network, for accessing an application in SaaS mode hosted by an application server external to said computer network, said method comprising the following steps:

so-called internal, authentication of said user with an identification server of said computer network, with a user identifier and a user device of said computer network;

transmission, by said user device to an IDAAS server external to said computer network, of an authentication request; and so-called external, authentication of said user with said IDAAS server, comprising the following steps:

transmission, by said IDAAS server to a web server of said computer network, of a first message comprising an event identifier associated with said user device, and recovery, by said web server, of said user identifier, transmission, by said web server to the IDAAS server, of a second message comprising said user identifier in order for said user to be authenticated with said IDAAS server.

In other words, at least one embodiment of the invention proposes to provide user access and authentication with an IDAAS server, with a view to accessing a SaaS application, using the authentication carried out to access the computer network. Thus, within the company's network, the user is only authenticated once, both in order to access the company's network and to access the SaaS applications for which access is managed by an IDAAS server outside the company's network. Consequently, the solution proposed by one or more embodiments of the invention allows for less cumbersome and time-consuming authentication of a user to access, from a computer network, with a SaaS application hosted on an application server external to said computer network.

Furthermore, in the solution proposed by at least one embodiment of the invention, management of access rights is carried out in a centralized manner by a single server, namely the identity server located on the computer network. Thus, it is not necessary to manage the access rights both in the company's internal identification server and in the IDAAS server external to the company's network. Access rights are managed in a simpler way, in order to create, delete and modify access rights for a particular user.

When external authentication of the user is successful, the method according to one or more embodiments of the invention may include redirecting the device of said user, and in particular of a web browser executed by said user device, to the application server, so that it can access the SaaS application.

Optionally, in at least one embodiment, proof of authentication can be stored within the user device confirming successful authentication with an IDAAS server.

Such proof of authentication can be an authentication token, an authentication certificate, an authentication key, etc.

According to at least one embodiment, the second message can be encrypted with a public key of the IDAAS server, previously communicated to said web server.

In at least one embodiment, only the IDAAS server can decrypt the second message and access the user identifier, and more generally all the data contained in the second message, by decrypting the second message with its private key. The public key of the IDAAS server can be communicated to the web server and stored on the web server, or in a memory accessible to the web server.

According to one or more embodiments, the second message can further comprise at least one of the following data:

the event identifier, in particular to identify the user to be authenticated and/or avoid the retry, a surname and/or a first name of the user, an event date, a proof of authentication provided by the internal authentication.

The internal proof of authentication can, for example, be an authentication certificate or token provided by the identity server at the time of internal authentication.

The proof of authentication can be available at the identification server, or at the web server or even at the user device.

The web server can recover the user identifier from:

the user device, or from the computer network's identification server.

In at least one embodiment, upon receipt of the first message, the web server requests this identifier from the identity server or from the user device.

In one or more embodiments, the web server obtains the user's identifier from the user device.

According to one or more embodiments, the user identifier is recovered by the web server using a CGI ("Common Gateway Interface") program executed by the web server.

Such a program can be pre-configured for the needs of the invention such that, as soon as the web server receives the first message, the CGI program is executed and recovers the user's identifier so that it is communicated to the IDAAS server in the second message.

According to one or more embodiments, the first message, respectively the second message, can be sent directly by the IDAAS server, respectively the web server, to the web server, respectively to the IDAAS server, without going via the user device.

According to one or more embodiments, the first message, respectively the second message, can be sent via the user device.

In at least one embodiment, the first message is communicated by the IDAAS server to the user device, which, itself, transmits the first message to the web server. Alternatively or in addition, in at least one embodiment, the second message is communicated by the web server to the user device, which, itself, transmits the second message to the IDAAS server. In other words, in at least one embodiment, the messages between the web server and the IDAAS server are exchanged via the user device.

According to one or more embodiments, external authentication can be carried out through a dedicated application installed on the user device.

Alternatively, in one or more embodiments, the external authentication can be carried out using a web browser at the user device. In at least one embodiment:

the issuance of the authentication request to the IDAAS server can be carried out via a web browser executed by the user device, and the messages between the web server and the IDAAS server can be exchanged via said browser.

In at least one embodiment, the user can display a web page of the IDAAS server in order to perform external authentication. The first message can be sent to the web server by redirecting the browser to a web page of the web server that then receives the first message: for example the first message may be found in whole or in part in the redirection URL. The web server can then recover the data, and particularly the user identifier, and construct the second message and optionally encrypt it. Then, the browser is redirected again to a web page of the IDAAS server so that said IDAAS server receives the second message: for example the second message can be found in whole or in part in the redirection URL.

The redirections may be transparent to the user. Optionally, in one or more embodiments, a waiting message or information message can be displayed in the browser asking the user to wait or providing them with information about the authentication process.

According to one or more embodiments, the external authentication step can be triggered following manual selection by the user of said external authentication.

For example, the user can confirm their intention to perform external authentication by selecting a button associated with said authentication that is then executed.

According to one or more embodiments, the external authentication step can be triggered automatically based on at least one item of data relating to said user device.

For example, a MAC address or an IP address of the user device transmitting the authentication request can be detected by the IDAAS server. If the IP address originates from a known computer network eligible for external authentication by said IDAAS server, then the IDAAS server can launch the external authentication step automatically.

In at least one embodiment, external authentication can be entirely transparent to the user.

According to one or more embodiments, when the user identifier is known by the IDAAS server, external authentication can be ended and the user can be considered to be authenticated with the IDAAS server.

In at least one embodiment, if the user's identifier is known by the IDAAS server, this means that said user is already known to the IDAAS server as they have already been subject to external authentication. As the user has already been authenticated by the identification server of the computer network, this means that they have the access rights allowing access to the SaaS applications.

According to one or more embodiments, when the user's identifier is not known by the IDAAS server, the external authentication can comprise a step of registering said user with the IDAAS server.

This registration step can be carried out according to any known registration solution, such as for example by the sending of an activation link to an email address, or a validation code to a telephone number, etc. This registration step can involve the provision of additional data by the user to the IDAAS server such as an email address, a telephone number, etc.

According to at least one embodiment of the invention, a user authentication system is proposed, from a computer network, with a view to accessing an application in SaaS mode hosted on an application server external to said computer network, said system comprising:

a user' device located within said computer network;

an identity server of said computer network located within said computer network;

a web server located within said computer network; and an identity-as-a-service server, IDAAS server, located outside said computer network;

configured to implement the steps of the method according to one or more embodiments of the invention.

The user device can execute a web browser used during external authentication.

The web server can run a CGI to recover the user's identifier from the user device or from the computer network's identity server.

Typically, the elements of the system can be configured to each perform the features disclosed hereinbefore in reference to the method according to one or more embodiments of the invention, and which are not repeated here for the sake of brevity.

BRIEF DESCRIPTION OF THE DRAWINGS

Other benefits and features shall become evident upon examining the detailed description of an entirely non-limiting embodiment, and from the enclosed drawings in which.

DETAILED DESCRIPTION OF THE INVENTION

It is clearly understood that the one or more embodiments that will be described hereafter are by no means limiting. In particular, it is possible to imagine variants of the one or more embodiments of the invention that comprise only a selection of the features disclosed hereinafter in isolation from the other features disclosed, if this selection of features is sufficient to confer a technical benefit or to differentiate the one or more embodiments of the invention with respect to the prior state of the art. This selection comprises at least one preferably functional feature which lacks structural details, or only has a portion of the structural details if that portion is only sufficient to confer a technical benefit or to differentiate the one or more embodiments of the invention with respect to the prior state of the art.

In the figures, the same reference has been used for the features that are common to several figures.

Figure 1:
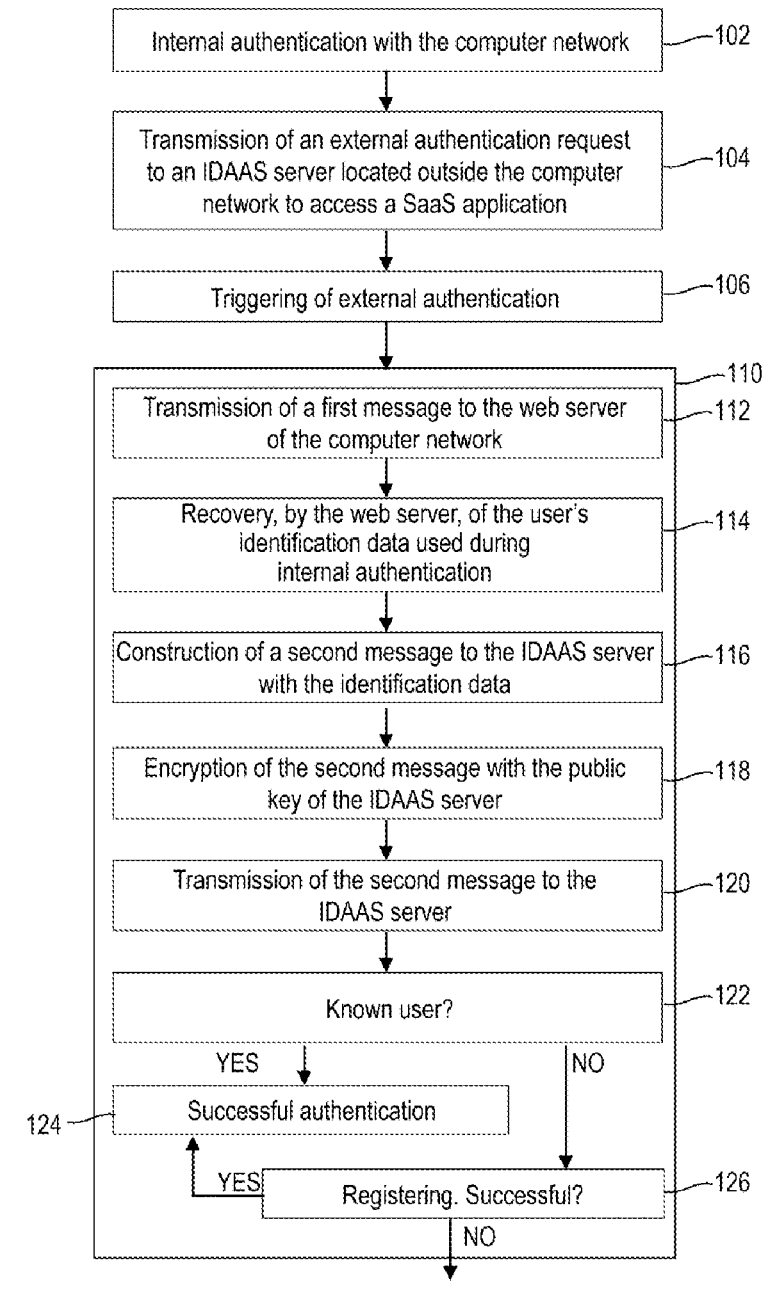
FIG. 1 is a schematic depiction of an authentication method according to one or more embodiments of the invention.

FIG. 1 is a schematic depiction of an authentication method according to one or more embodiments of the invention.

The method 100, depicted in FIG. 1, can be implemented in order to authenticate a user, on a given computer network, with a view to authorizing said user to access an SaaS application hosted on an application server outside the computer network.

The method 100 comprises a step 102 of authenticating, so-called internal authentication, a user on a user device in a computer network, such as for example a company network. The computer network can be a network local to a geographical site, or a network distributed over several sites.

The internal authentication can be carried out by entering a user identifier and a user password.

Internal authentication can be carried out according to a given authentication mechanism, such as for example Windows® authentication.

The internal authentication is carried out by verifying the user's access rights on an identification server storing, for each user identifier, the access rights associated therewith: access authorized or not, access level, type of data that can be accessed, etc.

When authentication is carried out successfully, proof of authentication is produced, such as for example a certificate of authentication, an authentication token or even an authentication key, such as for example in the Kerberos authentication mechanism. This proof of authentication can be stored on the user device and/or by the identification server.

After internal authentication, the user can access the services/data on the computer network with the user device.

The method 100 then comprises a step 104 of transmitting an authentication request, so-called external authentication, to an IDAAS server, in order to access one or more applications in SaaS mode hosted on one or more application servers outside the computer network.

The IDAAS server is located outside the computer network and manages user access and authentication to applications in SaaS mode.

The authentication request can be sent in various ways. According to at least one embodiment, the user logs onto an authentication page of the IDAAS server by virtue of a web browser executed by the user device being used, for example by entering the URL of said authentication page.

The method 100 then comprises a step 106 of triggering external authentication.

External authentication can be triggered manually by the user, for example by selecting a button associated with said external authentication, displayed on the authentication page.

Alternatively, in one or more embodiments, external authentication can be triggered automatically based, for example, on an IP address of the user device detected by the IDAAS server. In at least one embodiment, if the IP address originates from a known computer network eligible for external authentication by said IDAAS server, then the IDAAS server can launch the external authentication step automatically.

The method 100 then comprises an external authentication step 110.

The external authentication step 110 comprises a step 112 of transmitting a first message to a web server in the computer network. This first message comprises an event identifier. The event identifier can be, or can comprise, an identifier of the user device or even the IP address of the user device.

The first message can be sent directly to the web server. Alternatively, in at least one embodiment, the first message can be sent to the web server via the user device.

According to at least one embodiment, and particularly advantageous, the first message is sent by a browser redirection executed by the user device to an authentication page of the web server. For this, the URL of the authentication page of the web server can be filled in beforehand and stored by the IDAAS server. The first message can be attached to said URL of the authentication page of the web server.

Then, during a step 114, the web server of the computer network recovers the user identifier for the user. For this, the web server runs a CGI ("Common Gateway Interface") program that recovers the user identifier from the user device, optionally after having verified the proof of authentication for said user device.

Then, during a step 116, a second message is constructed, by the CGI program or by the web server, with the user's identifier and optionally at least one of the following data:
   the event identifier, in particular to identify the user to be authenticated and/or avoid the retry,
   a surname and/or a first name of the user,
   an event date,
   a proof of authentication provided by the internal authentication.

During a step 118, the second message is encrypted by a public key of the IDAAS server such that it can only be read by the IDAAS server. The public key of the IDAAS server can be communicated beforehand to the web server, for example when configuring the web server to carry out external authentication.

The external authentication step 110 then comprises a step 120 of transmitting the second message to the IDAAS server.

The second message can be sent directly to the IDAAS server by the web server. Alternatively, in one or more embodiments, the second message can be sent to the IDAAS server via the user device.

According to at least one embodiment, and particularly advantageous, the second message can be sent to the IDAAS server by, or at the same time as redirecting the browser carried out by the user device to a web page of the IDAAS server. For this, the URL of the web page of the IDAAS server can be filled in beforehand and stored by the web server. The second message can be attached to said URL.

During a step 122, the IDAAS server decrypts the second message in order to obtain the user identifier. This user identifier is compared to the list of user identifiers known by the IDAAS server.

If the user identifier is known by the IDAAS server, then the user is authenticated and access to the SaaS applications is authorized during a step 124.

Otherwise, in at least one embodiment, a registration step 126 is carried out according to known techniques. Access is only authorized if the registration step is carried out successfully. Otherwise, in at least one embodiment, access is not authorized and authentication can be repeated from step 102 or 106 depending on the cases.

When external authentication 110 of the user is carried out successfully, the method 100 can involve redirecting, by the IDAAS server, the device of this user, and in particular its browser, to the application server so that the user can access the SaaS application. Optionally, in one or more embodiments, a proof of authentication is stored on the user device confirming successful authentication by an IDAAS server. Such proof of authentication can be a token, a certificate, a key, etc.

Figure 2:
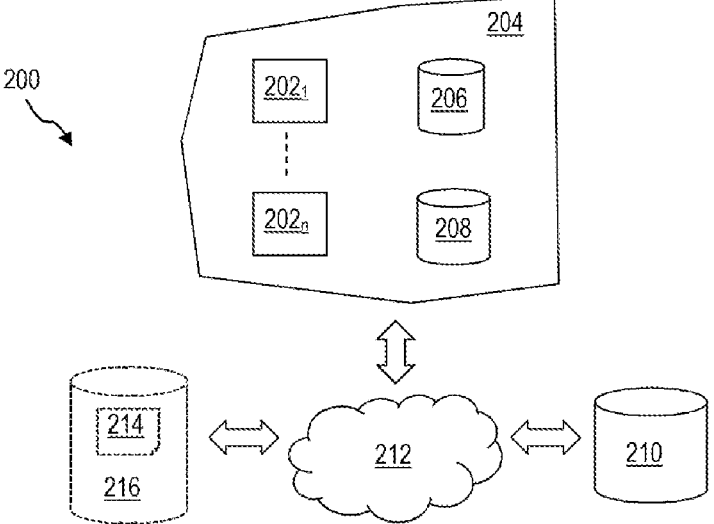
FIG. 2 is a schematic depiction of an authentication system according to one or more embodiments of the invention.

FIG. 2 is a schematic depiction of an authentication system according to one or more embodiments of the invention.

The system 200, depicted in FIG. 2, can be used to implement any method according to one or more embodiments of the invention, and in particular the method 100 in FIG. 1.

The system 200 comprises at least one user device $202_1$- $202_n$ located within a computer network 204, such as a company network. Each user device can be a computer, a tablet, a Smartphone, etc.

The system 200 further comprises at least one identity server 206 in order to manage the authentication of devices located in the computer network in accordance with a given authentication mechanism. The identification server stores the authentication data of each user authorized to connect to the computer network 204.

The system 208 comprises a web server 208 to manage the external authentication of each user with an IDAAS server 210 not located on the computer network 204. The computer network 204 and the IDAAS server 210 are in communication via the Internet network 212.

Thus, a user who authenticated within the computer network 204 via a user device $202_i$ can then benefit from this authentication, within the computer network, in order to be authenticate with the IDAAS server 210 with a view to accessing SaaS applications 214 hosted on an application server 216. The application server 216 communicates with the computer network 204 and the IDAAS server 210 via the Internet network 212.

Of course, these examples are only given by way of specific examples and one or more embodiments of the invention are not limited to the examples given above. Numerous variants can be envisaged for the examples given above without departing from the scope of the invention as defined in the main claims.

The invention claimed is:

1. A method of authenticating a user located in a computer network, for accessing an application in SaaS mode hosted by an application server external to said computer network, said method comprising:
    an internal authentication, of said user with an identification server of said computer network, with a user identifier and a user device of said computer network;
    transmission, by said user device to an identity-as-a-service (IDAAS) server external to said computer network, of an authentication request; and
    an external authentication of said user by said IDAAS server, wherein said external authentication comprises
        transmission, by said IDAAS server to a web server of said computer network, of a first message comprising an event identifier associated with said user device,
        recovery, by said web server, of said user identifier,
        transmission, by said web server to the IDAAS server, of a second message comprising said user identifier in order for said user to be authenticated by said IDAAS server.

2. The method according to claim 1, wherein the second message is encrypted with a public key of the IDAAS server, previously communicated to said web server.

3. The method according to claim 1, wherein the second message further comprises at least one of
    the event identifier,
    a surname of the user, a first name of the user or both the surname of the user and the first name of the user,
    an event date,
    a proof of authentication provided by the internal authentication.

4. The method according to claim 1, wherein the web server recovers the user identifier from the user device or from the identification server of the computer network.

5. The method according to claim 1, wherein the user identifier is recovered by the web server using a Common Gateway Interface (CGI) program executed by the web server.

6. The method according to claim 1, wherein the first message and the second message are transmitted via the user device.

7. The method according to claim 1, wherein the transmission of the authentication request to the IDAAS server is carried out via a web browser executed by the user device, and wherein the first message and the second message between the web server and said IDAAS server are exchanged via said web browser.

8. The method according to claim 1, wherein the external authentication is triggered following a manual selection by the user of said external authentication.

9. The method according to claim 1, wherein the external authentication is triggered automatically based on at least one item of data relating to said user device.

10. The method according to claim 1, wherein, when the user identifier is known by the IDAAS server, the external authentication is ended and the user is considered to be authenticated with the IDAAS server.

11. The method according to claim 1, wherein, when the user identifier is not known by the IDAAS server, the external authentication comprises registering said user with the IDAAS server.

12. A user authentication system, from a computer network, for accessing an application in SaaS mode hosted in an application server external to said computer network, said user authentication system comprising:

user device located within said computer network;

an identity server of said computer network located within said computer network;

a web server located within said computer network; and an identity-as-a-service (IDAAS) server located outside said computer network;

wherein said user authentication system is configured to implement a method of authenticating a user located in said computer network, said method comprising an internal authentication, of said user with an identification server of said computer network, with a user identifier and the user device of said computer network;

transmission, by said user device to said IDAAS server external to said computer network, of an authentication request; and an external authentication of said user by said IDAAS server, wherein said external authentication comprises transmission, by said IDAAS server to said web server of said computer network, of a first message comprising an event identifier associated with said user device, recovery, by said web server, of said user identifier, transmission, by said web server to the IDAAS server, of a second message comprising said user identifier in order for said user to be authenticated by said IDAAS server.

\* \* \* \* \*